United States Patent [19]

Rau et al.

[11] 4,204,579
[45] May 27, 1980

[54] CULTIVATOR WITH PIVOTAL TINES

[75] Inventors: Willy Rau, Weilheim; Christian Taus, Kirchheim, both of Fed. Rep. of Germany

[73] Assignee: Maschinenfabrik Rau oHG, Weilheim, Fed. Rep. of Germany

[21] Appl. No.: 827,708

[22] Filed: Aug. 25, 1977

[30] Foreign Application Priority Data

Aug. 26, 1976 [DE] Fed. Rep. of Germany ....... 2638438
Jul. 8, 1977 [DE] Fed. Rep. of Germany ....... 2730858

[51] Int. Cl.² .................................... A01B 61/04
[52] U.S. Cl. .................... 172/657; 172/624; 172/676; 172/688; 172/700; 172/724
[58] Field of Search ............ 172/134, 239, 261, 264, 172/265, 291, 447, 382, 488, 613, 657, 658, 676, 687, 688, 699, 700, 724, 730, 142, 643, 708

[56] References Cited

U.S. PATENT DOCUMENTS

| 382,513 | 5/1888 | Cooper | 172/643 |
|---|---|---|---|
| 1,867,521 | 7/1932 | Mote | 172/657 |
| 2,430,223 | 11/1947 | Goode | 172/688 X |
| 3,172,481 | 3/1965 | Trollsas | 172/261 |
| 3,266,579 | 8/1966 | Hofer | 172/657 X |
| 3,431,981 | 3/1969 | Hofer | 172/657 X |
| 4,061,194 | 12/1977 | McCanse | 172/447 |

FOREIGN PATENT DOCUMENTS

| 1016002 | 8/1977 | Canada | 172/657 |
|---|---|---|---|
| 214525 | 10/1909 | Fed. Rep. of Germany | 172/643 |
| 2410290 | 9/1974 | Fed. Rep. of Germany | 172/134 |
| 181360 | 11/1962 | Sweden | 172/657 |
| 368819 | 4/1973 | U.S.S.R. | 172/730 |
| 436628 | 12/1974 | U.S.S.R. | 172/700 |

*Primary Examiner*—Richard T. Stouffer
*Attorney, Agent, or Firm*—Michael J. Striker

[57] ABSTRACT

A cultivator has a frame normally carried on the back of a tractor and pulled in a predetermined direction along the ground. A plurality of tines extend downwardly from this cultivator and penetrate the ground. Each tine is pivotal about a respective axis perpendicular to the direction of travel and parallel to the ground and is biased into a normal central position by means of a respective hydraulic actuator. The cylinders of all of the hydraulic actuators are connected together in a closed network so that if one tine is forced backwardly the other tines will be urged correspondingly forwardly and vice versa. In addition each such tine, which also may be mounted on a parallelogrammatic linkage, may carry a V-shaped backwardly extending blade increasing the mixing and aeration effect of the cultivator.

28 Claims, 18 Drawing Figures

CULTIVATOR WITH PIVOTAL TINES

BACKGROUND OF THE INVENTION

The present invention relates to an agricultural ground-working apparatus. More particularly, this invention concerns a cultivator.

A cultivator typically comprises a frame which is secured to the back of a tractor or other prime mover, usually at the three-point hitch thereof. A plurality of tines or similar ground-penetrating tools extend downwardly from this frame. As the frame is pulled along the ground in a normal direction of travel by the tractor the ground-penetrating tines work the soil, loosening and aerating it.

The ground-penetrating tools or tines of the cultivator are often mounted rigidly on the frame of the cultivator. Thus, whenever a solid object is struck by one of the tines, the entire frame will often rise up so that the one tine can clear the object it has struck, thereby leaving an unworked area of the field. The advantage of such rigid mounting of the tines is that it is possible to produce the cultivator at low cost.

It has been suggested to mount each of the tines pivotally on the frame and provide biasing means in the form of a spring for urging each time forwardly into a position extending generally perpendicular to the frame. Should such a tine be pulled against an obstacle it is therefore possible for it to pivot backwardly from its normal forward position, moving over the obstacle with only minor upward deflection of the frame carrying the tines. Such an arrangement has proven in practice to be unsatisfactory in that the springiness of the tines makes pulling the device through the ground quite difficult. Furthermore, when not perfectly set some of the tines invariably dig into the ground somewhat less than the others so that the cultivation is uneven or irregular.

SUMMARY OF THE INVENTION

It is therefore an object of the present invention to provide an improved ground-working agricultural implement.

Another object is to provide an improved cultivator.

These objects are attained according to the present invention by mounting the tines pivotally on the frame substantially as described above. Each tine is, however, displaceable both forwardly and backwardly from a normal central position which it normally assumes during the cultivating operation. Equalizing means is provided which, on backward displacement of one or more of the tines due to impingement on an object such as a rock, displaces the other tines forwardly from their normal central position. Thus should one tine strike a rock and be pushed upwardly, the other tines will only dig that much deeper into the ground, thereby counteracting the tendency of an object to push the entire arrangement out of the ground. In this manner it is possible to obtain an extremely uniform and even cultivation.

According to further features of this invention equalizing means is constituted as a plurality of hydraulic cylinder-and-piston units or actuators each of which is connected at one end to the frame and at the other end to a respective tool or tine. All of these hydraulic units are connected together and form a fixed-volume chamber so that if the volume of one of the units is decreased by backward deflection of the respective tine, this loss in volume at the one location is compensated for at an other location by automatic forward displacement of at least one other tine. Such an arrangement gives extremely even working of the ground and causes the cultivator to exert an extremely regular pull on the tractor or other prime mover pulling it, so that strain to this tractor of its hitch is reduced. Restrictions or small adjustable throttle valves may be provided at each cylinder to slow down or damp the automatic compensation somewhat.

Such a system is advantageous in particular when cultivating relatively soft earth. The wheels of the tractor typically leave relatively deep grooves or tracks in the field. Those cultivator tines which ride along in these grooves or tracks will therefore meet less resistance, so that they will swing forward and dig more deeply into the ground. Thus, the entire area behind the tractor will be evenly worked, including the packed-down tracks of the tractor. It is also within the scope of this invention to mount those cultivator tines aligned behind the tractor in the tracks somewhat lower than the other tines to enhance this effect.

In accordance with further features of this invention each ot these tines or tools is pivoted about a respective horizontal axix extending perpendicular to the normal direction of travel of the apparatus. This axis lies substantially ahead of, by which is meant in a vertical plane level with or forward of, the respective tool in the central position thereof. Each tine may have an upwardly directed arm which is connected via the respective piston-and-cylinder unit to the frame for automatic setting as described above. It is also possible in accordance with this invention to mount each of the tines on a generally parallelogrammatic linkage. The tine may be mounted on a member opposite that portion of the linkage constituted by a fixed part of the frame, or may be pivoted on the frame directly.

According to further features of this invention it is possible to provide one or all of the tines with backwardly extending blades. Such a blade may be generally V-shaped and is attached to the rear edge of the tine so as to ride along in the wake of the tine as it itself is pulled through the ground. Means in form of a plurality of holes may be provided for mounting the blade at different levels on the back of the tine, or even for mounting several such blades on a single tine. It is also within the scope of this invention to sharpen the edges of such a blade, and to provide it with vertically upwardly extending projections or wings that will once again enhance the aeration effect of the arrangement and mixing of the ground through which such a cultivator is pulled.

Furthermore, such a tine may be incorporated in a parallelogrammatic linkage as described above, in which case the tine is mounted on a member constituting that portion of the linkage opposite a portion formed by a fixed part of the frame. In this manner the linkage constitutes means for maintaining this blade generally parallel to the ground, as when the tine swings up the blade will automatically be maintained generally parallel to the opposite member of the generally parallelogrammatic linkage.

The ground-penetrating tool according to this invention may be vertically displaceable on the respective mount and a wheel may be provided for further depth control. Such a wheel should also be vertically displaceable on the mount for exact setting of the cultivation depth.

The mounting means according to a further feature of this invention comprises a mount which can releasably be bolted to the frame of the apparatus for positioning of the respective tine and actuating mechanism, as well as for removal and replacement of any such unit should servicing be required. Merely removing two nuts mounted over bolts welded to the mount and a simple disconnection of the respective hydraulic actuator allows the entire sub-assembly to be removed from the apparatus.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

SPECIFIC DESCRIPTION OF PREFERRED EMBODIMENTS

The arrangement shown in FIGS. 1, 2, 4, 7 and 8 has a frame 20 constituted by a pair of inner longitudinal beams 21, three transverse beams 22–24, and outer longitudinal beams 25 and 26 all attached at their front end to an upright 27 adapted to be connected to the three-point hitch of a tractor to be pulled in a transport direction T. This support 20 carries two front tools or tines 28, three middle tools or tines 29, and three rear tools or tines 30, all staggered relative to one another so as to each act in a respective path parallel to the transport direction T. The front tines 28 are all pivotal about a common front axis $X_1$, and the middle tines 29 and back tines 30 are respectively pivotal about axes $X_2$ and $X_3$ that are all parallel to each other, horizontal, and perpendicular to the direction T.

Each of the tines has a removable and replaceable front plate 31 with a tip 31a. Each tine normally lies in a central position illustrated in solid lines in FIG. 1 and shown for the tine 29 only in FIG. 2. In this central position the tip 31a is spaced by a distance a behind a vertical plane extending through the respective pivot axis. Each tine can be displaced forwardly into a position such as shown in dot-dashed lines at 28' in FIG. 1 or in solid lines as shown at 28' and 30' in FIGS. 2 and 4. Furthermore, each tine can be moved somewhat backwardly into a primary rear position as shown in dot-dashed lines at 29" in FIG. 1 or at 30" in FIG. 2. Finally, it is even possible to deflect one of the tines all the way upwardly backwardly into a far-back position such as shown at 29''' in FIG. 4.

Figure 1:
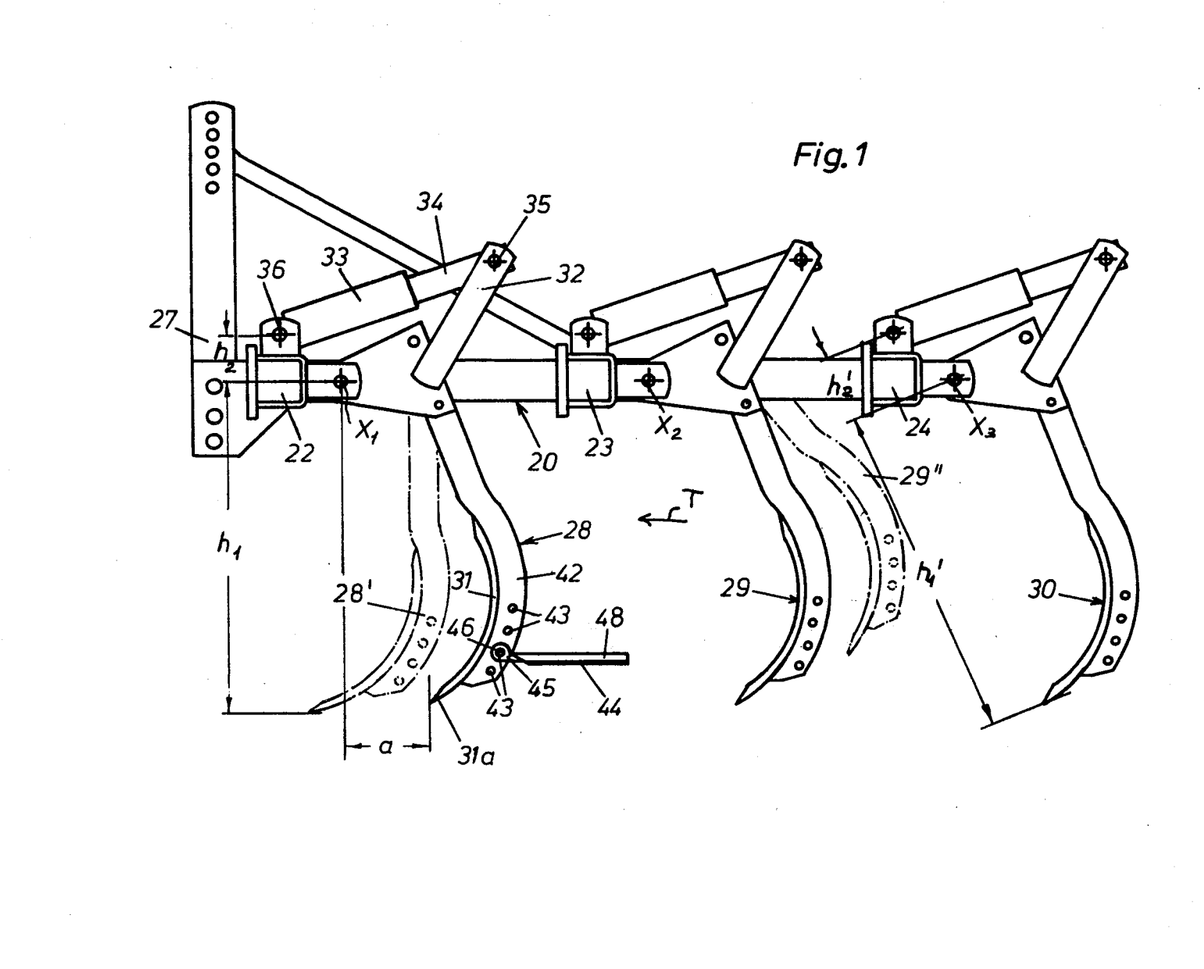
FIGS. 1 and 2 are side views of an apparatus according to this invention in different operational positions.
Figures 2, 3:
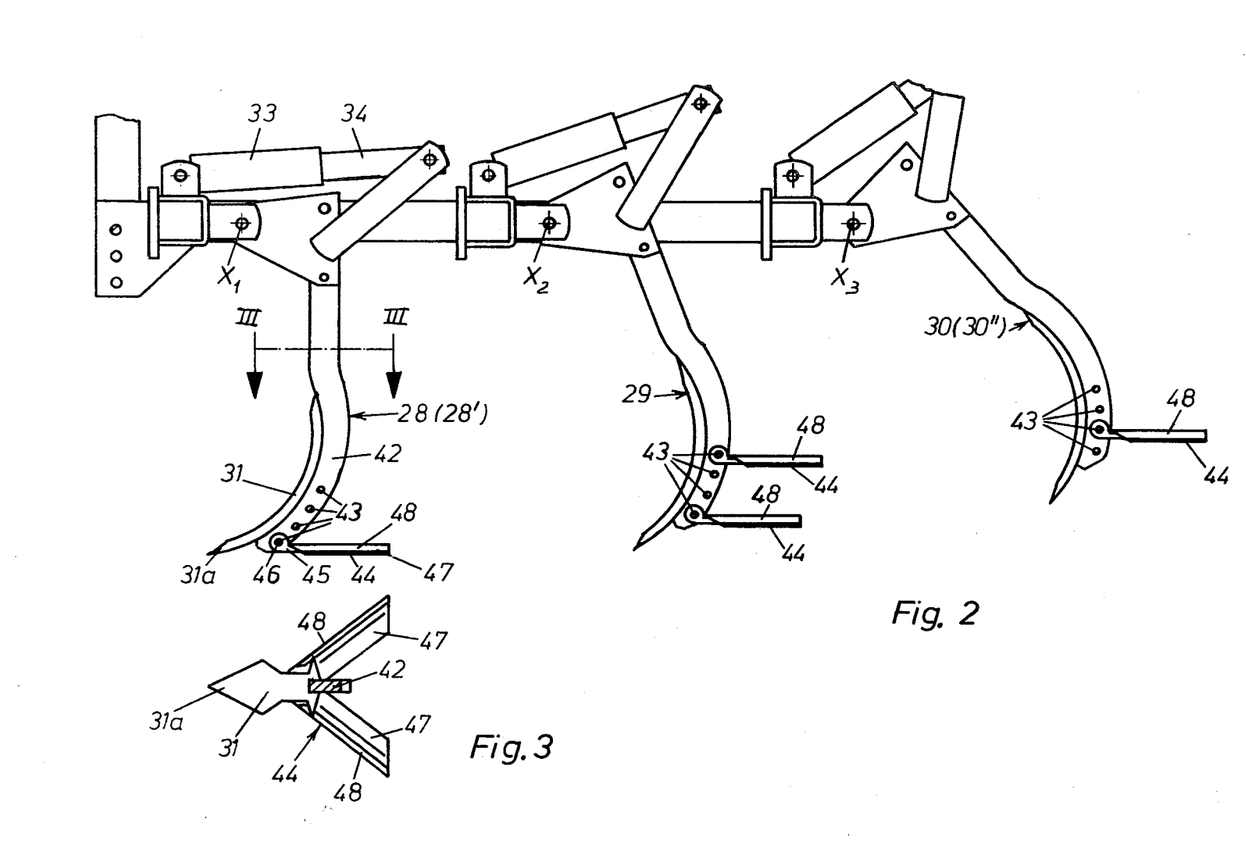
FIG. 3 is a section taken along line III—III of FIG. 2.
Figure 4:
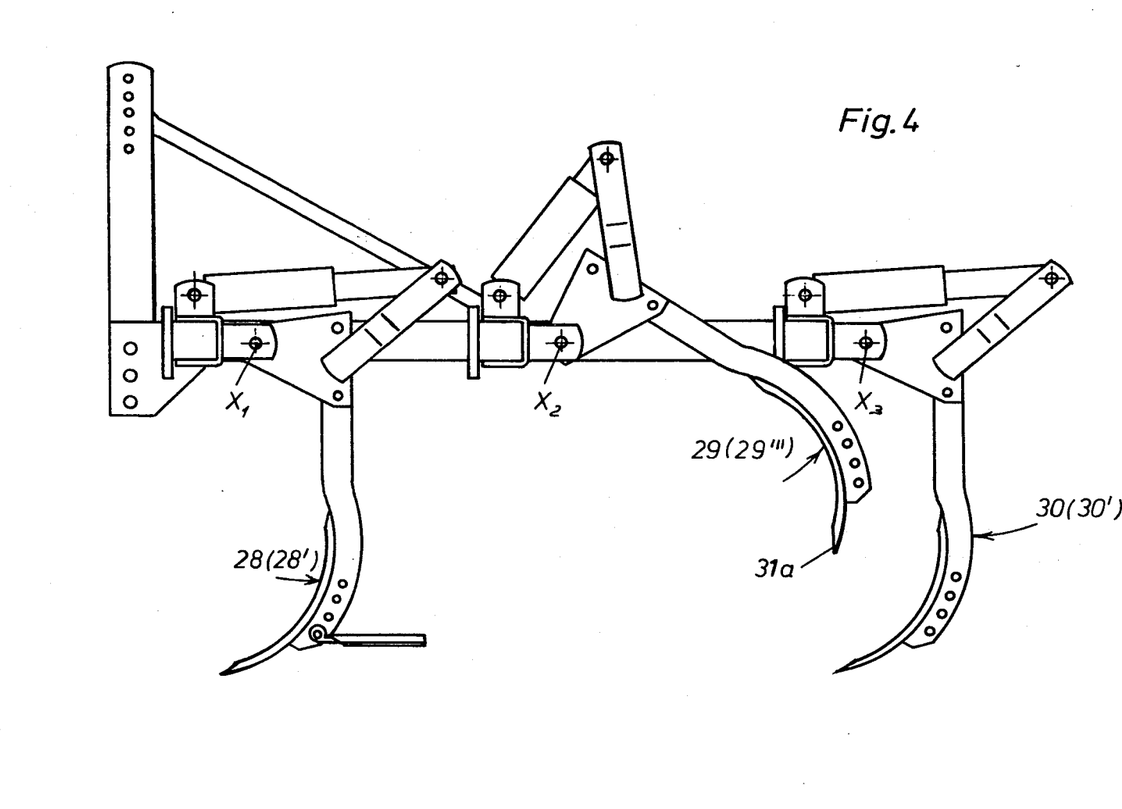
FIG. 4 is a view similar to FIGS. 1 and 2 showing the apparatus in yet another operational position.

Each of the tines is provided with an upwardly and backwardly extending arm 32 pivoted at 35 to the piston rod 34 of a hydraulic cylinder 33 in turn pivoted at its front end at 36 on the respective member 22, 23, or 24. A closed network of conduits 37–41 connect the compartments of all of these piston-and-cylinder units 33 and forms with them a closed fixed-volume chamber. Thus as shown in FIG. 1 if one of the middle tines 29 is moved back into the position shown at 29" another tine such as the tine 28 will be moved forwardly into the position shown at 28'. Correspondingly as shown in FIG. 2 if the back tine is moved into the position 30" the front tine can be moved into the position 28'. Finally, if, as shown in FIG. 4, the middle tine is moved into the position shown at 29''' both the front and rear tines can be moved into the forward positions 28' and 30'. Of course any permutation of these combinations is possible, it merely being apparent that as any tine is moved in one direction a force will be generated in the hydraulic system to displace the other tines in the opposite direction, and that tine meeting the least resistance will be displaced forwardly the furthest.

The distance $h_1$ between the axis for each tine and the point thereof measured parallel to the longitudinal axis of the respective tine which itself is vertical in the central position thereof bears a relationship to the distance $h_2$ measured in the same direction between the front pivot 36 for the hydraulic actuator 33 and the respective pivot axis which is such as that as each tine is deflected backwardly the lever arm thereof increases. Thus the dimensions in the back position as shown in FIG. 1 are $h_1'$ and $h_2'$. The following mathematical relationship holds:

$$h_2'/h_1' > h_2/h_1.$$

Thus the lever arm for the cylinder 33 is increased and the resistance to further backward deflection of the respective tine is similarly increased as it moves backwardly.

Figure 8:
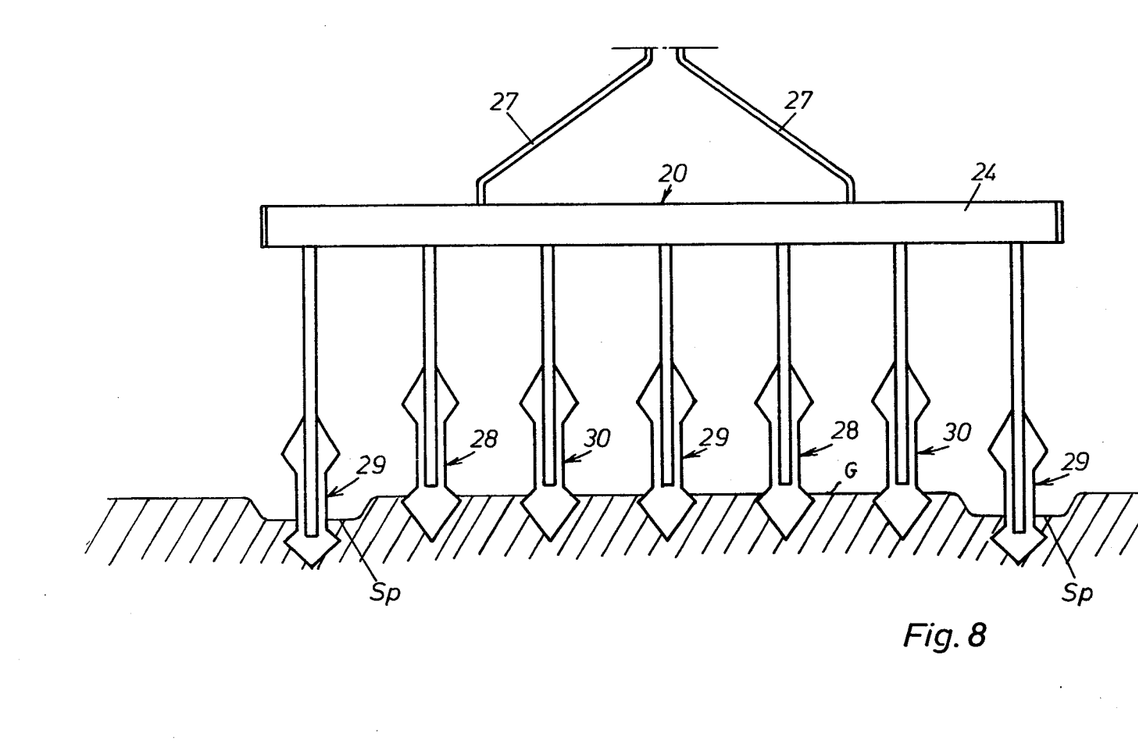
FIG. 8 is a back view of the apparatus of FIG. 7.

FIG. 8 shows how the outermost tines, here the two end tines 29, may be either mounted so as normally to lie lower than the other tines, or automatically assume such a lower position since the wheels of the tractor pulling the arrangement normally form grooves or tracks $S_p$ in the ground G. Thus the arrangement insures even working of the ground even in the packed-down portion of these tractor tracks $S_p$.

Figure 5:
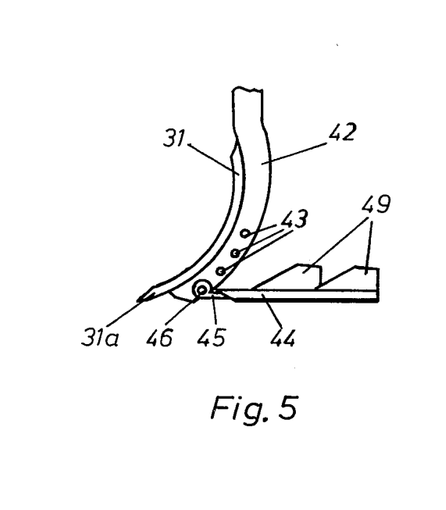
FIGS. 5 and 6 are side and top sectional views of accessories useable with the instant invention.
Figure 6:
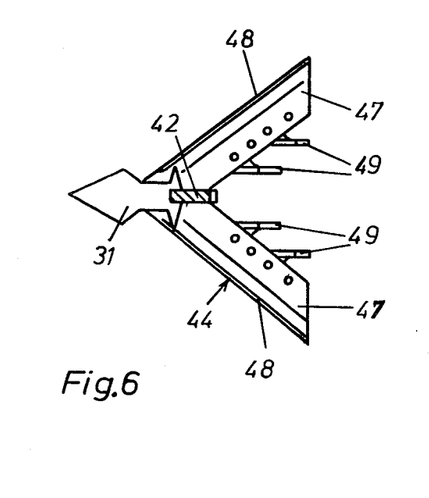
Figure 7:
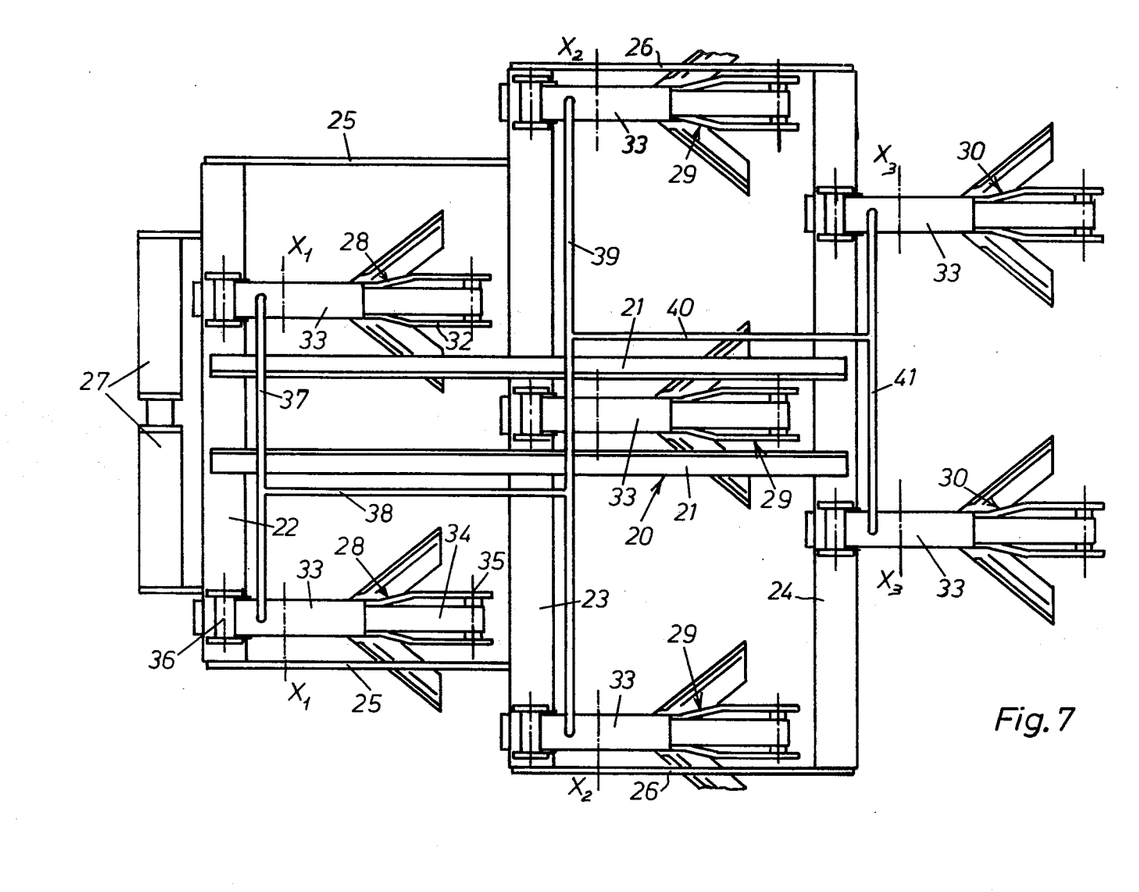
FIG. 7 is a top view of the apparatus shown in FIGS. 1, 2, and 4.

FIGS. 1–3 also show how the back part 42 of each tine is formed with a vertical row of horizontal and transversely extending throughgoing holes 43 at each of which may be mounted a respectively shaped backwardly extending blade 44 having at its front end an eye 45 and a pin or bolt 46 for securing to the respective hole 43. These blades 44 as best shown in FIG. 3 have sharpened outer edges 48 along each side of each V-leg 47. It is possible to mount them at any of the holes along the back 42 of the respective tine, or even to mount two such blades 44 on a single tine as shown for tine 29 in FIG. 2. Such blades 44 insure excellent working and aeration of the ground. FIGS. 5 and 6 further show how it is possible to provide these blades 44 each with upstanding wings 49 that further enhance the ground-working effect.

Figure 9:
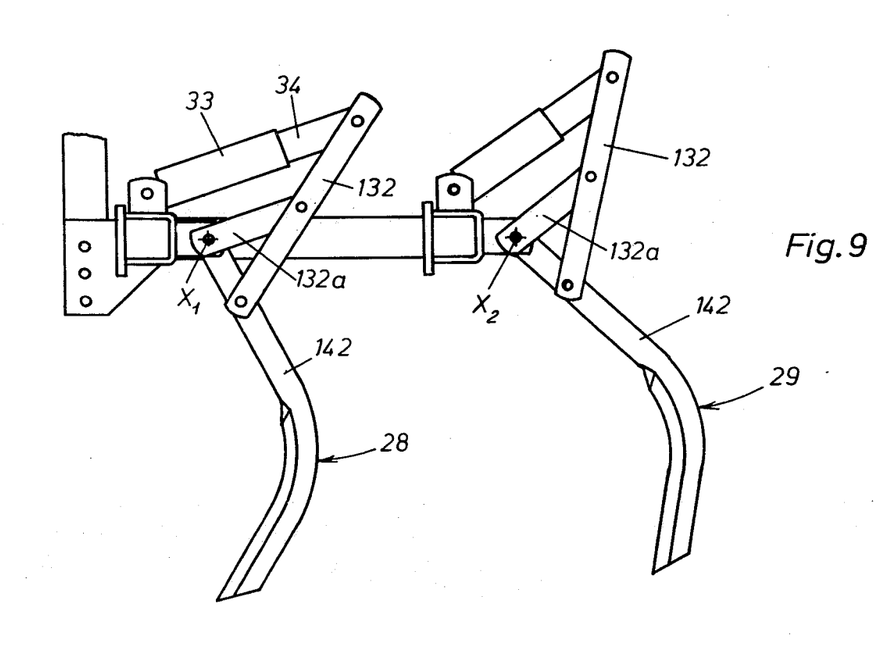
FIGS. 9, 10, and 11 are side views of other arrangements in accordance with this invention.

FIG. 9 shows another arrangement wherein the tines 28 and 29 have bodies 142 provided with rigid arms 132 that extend upwardly and backwardly from each such body 142. A link 132*a* connects each such arm 132 to the respective pivot axis $X_1$ or $X_2$. The hydraulic cylinder or actuator 33 is connected to the upper end of this arm 132. Such an arrangement makes the assembly cost of the device quite inexpensive, and allows the lever arm through which the cylinder 33 is effective easily to be varied.

Figures 10, 11, 12:
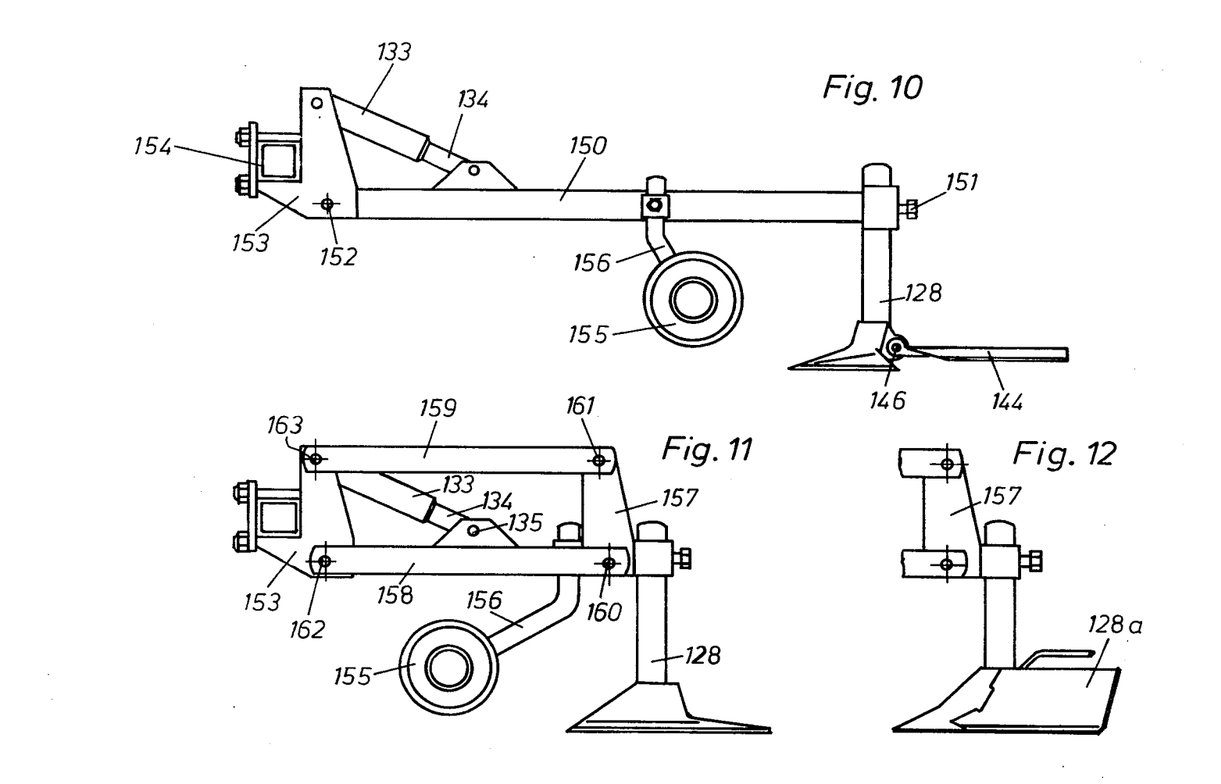
FIG. 12 is a detail view showing an accessory useable with the arrangement of FIG. 11.

The arrangement in FIG. 10 comprises a spade or share-type cultivator tool mounted on a vertical rod 128 securably adjustably by a bolt 151 at the back of a relatively long arm 150 pivoted at its front end at a pivot pin 152 and a mounting plate 153 carried on a frame 154. Here a cylinder 133 has a rod 134 and extends from the mounting plate 153 to an intermediate portion of the beam 150. Furthermore another height-adjustable beam 156 is provided carrying a wheel 155 which helps to establish the depth at which the tool at the end of the rod 128 normally rides. The horizontal length of the beam 150 is a multiple of the vertical distance between the tool and the beam 150 so that it can easily be deflected upwardly. Furthermore, the arrangement is provided with a pivot 146 or blade 144 identical to that shown at 44 in FIGS. 1–3.

In FIG. 11 the arrangement 128 is mounted on a plate 157 connected via a pair of links 158 and 159 to the plate 153. The link 158 is pivoted at its front end 162 on the plate 153 and at its rear end 160 on the plate 157. Similarly, the plate 159 is pivoted at its front end at 163 on the plate 153 and at its rear end 161 on the plate 157 to form with these plates 153 and 157 and with the beam 158 a parallelogrammatic linkage. The cylinder 133 is pivoted at its front end at the pivot 163 and its rear end has its piston rod 134 pivoted at 135 at an intermediate portion of the lower link 158 that also carries the wheel 155 and mounting rod 156. Thus the rod 128 will always be maintained vertical by the parallelogrammatic linkage. FIG. 12 shows how a rearward extension 128*a* on the tool allows the ground-working effect further to be enhanced. The cylinders of the arrangements of FIGS. 10 and 11 are connected together for automatic adjustment as described above. It is noted that with such arrangements they are normally locked temporarily in place by means of a jig or the like as the cylinders are all initially charged up and air is bled from the system. Thereafter the device will automatically adjust itself.

Figures 13, 15, 16, 17, 18:
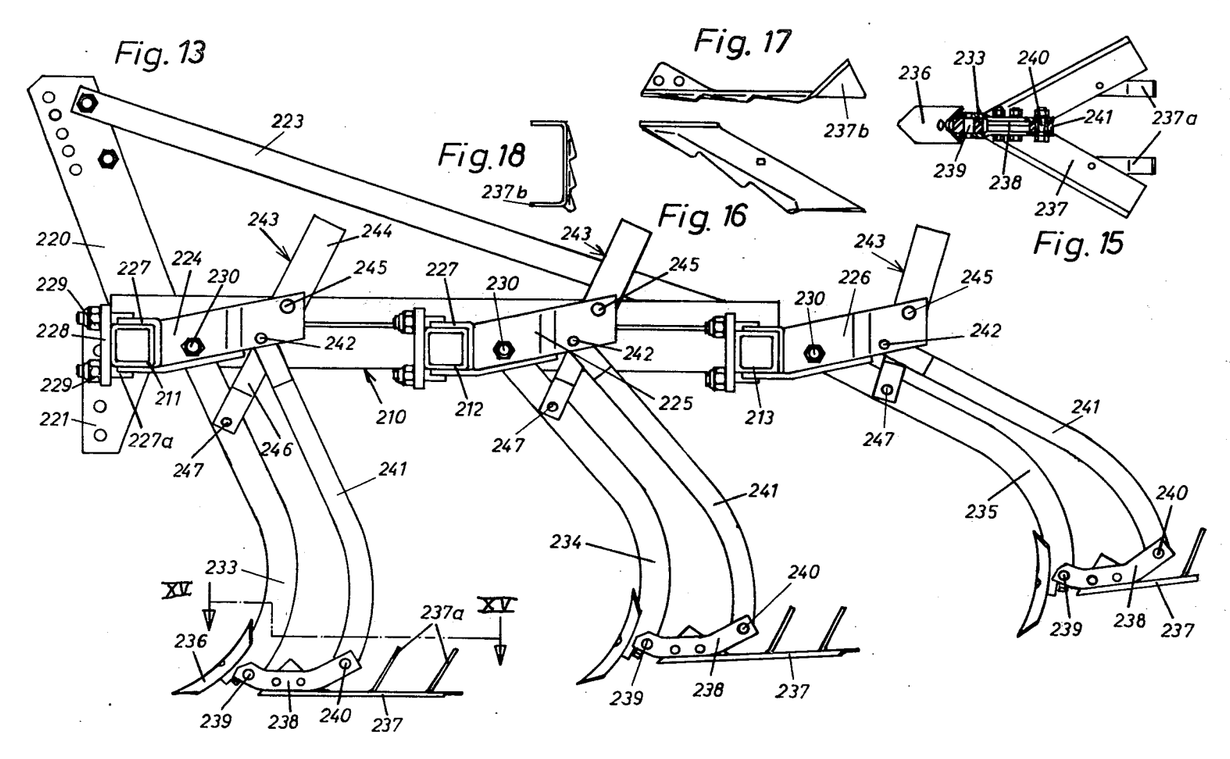
FIGS. 13 and 14 are side and top views respectively of yet another arrangement in accordance with this invention.
FIG. 15 is a section taken along line XV—XV of FIG. 13.
FIGS. 16, 17, and 18 are top, side, and end views of a blade accessory useable with the instant invention.
Figure 14:
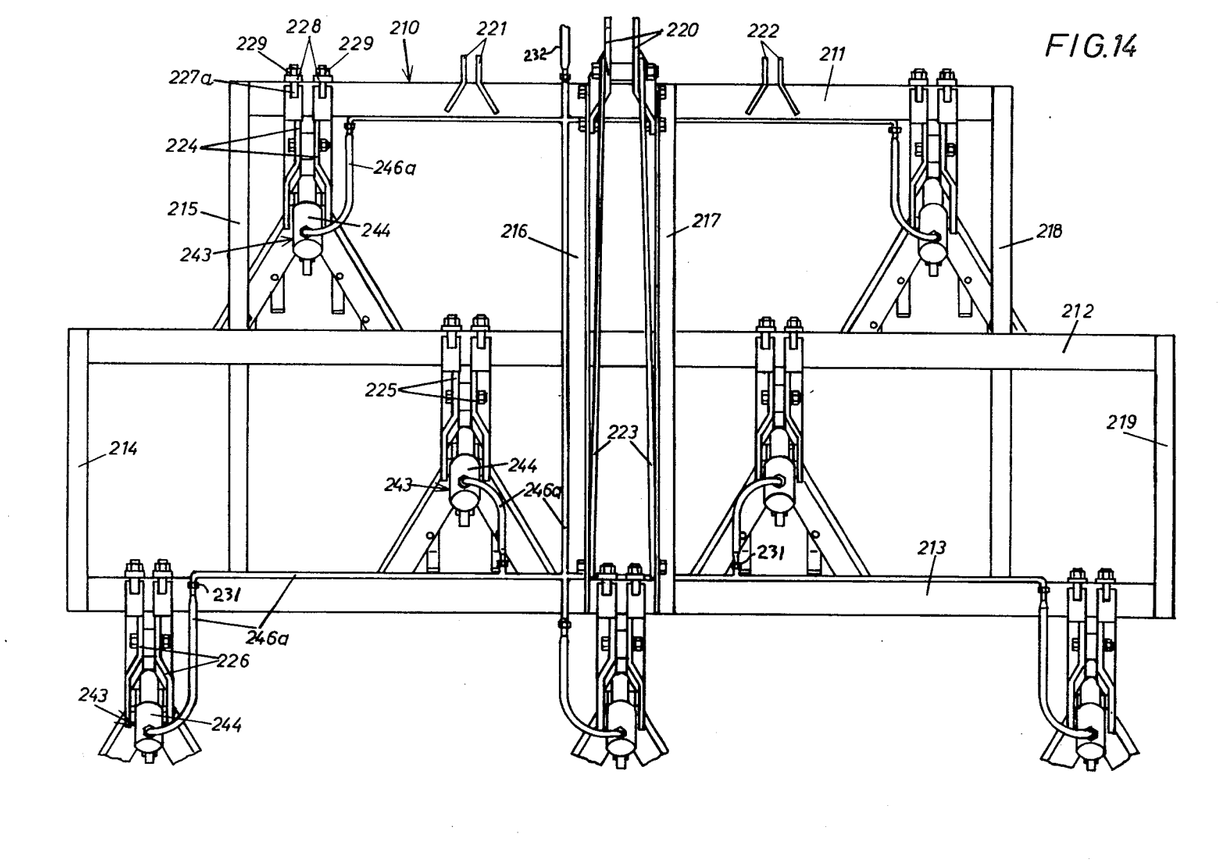

The apparatus of FIGS. 13 and 14 has a frame 210 formed by front, intermediate and rear transverse beams 211, 212, and 213 interconnected by longitudinal beams 214–219 extending in the transport direction. At its front end the frame is provided with an upright 220 and hitches 221 and 222 for connection to the three-point hitch of a tractor, with stabilizing bars 223 extending from the upright 220 to the rear end of the frame to insure rigid mounting.

The beams 211, 212, and 213 carry mounts 224, 225, and 226 of identical construction. Each mount is provided at its front end with a U-shaped socket assembly 227 that snugly fits around the respective square-sectioned beam 211–213. A pair of studs 227*a* are welded to the top and bottom flanges of the formation 227 so that a two-hole plate 228 can be bolted to the front of the respective beam 211–213 by means of nuts 229. Thus the mounts can readily be displaced along the respective beams and can easily be removed therefrom for repair if desired.

Each of the mounts 224–226 has a front pivot bolt 230 on which is pivoted the arm 233–235 carrying the plate 236 constituting the respective lower end of the respective tool. A V-shaped plate or blade 237 generally similar to that described above with reference to FIGS. 1–8 is riveted to a link or plate 238 pivoted at its front end 239 on the lower end of the respective arm 233–235 and at its rear end at 240 on a rear arm 241 extending parallel to the respective front arm and pivoted at its upper end at 242 between the two plates constituting the respective mounts 224–226. In addition a piston-cylinder unit 243 is received between the plates of each of these mounts 224–226 and has a cylinder part 244 pivoted at 245 on the respective mount and a piston 246 pivoted at 247 on the front arm 233–235 of the respective tool. Conduits 246*a* shown in FIG. 14 interconnect all of the cylinder units 243 and are provided with combined connections and throttle valves 231 at each of the units 243. Each of the plates 237 is formed with upwardly and backwardly extending wings 237*a* as also shown in FIG. 15.

The arrangement described above operates similarly to that described with reference to FIGS. 1–8. As any of the tools is deflected backwardly, as can be seen by comparison of the positions of the various tools in FIG. 13, the other tools will be urged forwardly. Thus that tool meeting the least resistance will move forwardly and that tool meeting the most resistance will move backwardly and upwardly. The use of the parallelogrammatic-type linkage ensures proper positioning of the tools and extremely rigid mounting also.

Finally FIGS. 16–18 show how the back-side corners of the blades 237 are bent up as triangles 237*b*. Their edges may be sharpened so that these formations further enhance the mixing and aeration effect of the respective blades.

It is noted above that any of the elements of any of the embodiments may be combined with elements of any of the other embodiments. Thus, for example, the wheels of the arrangements of FIGS. 10 and 11 may be applied to the frames 20 or 210. Similarly, the plates shown at 44, 144 and 237 can be used on any of the arrangements, not only on those arrangements where they are shown. Furthermore, the hydraulic network may be connected as shown at 232 in FIG. 14 to a source of hydraulic fluid under pressure so that even during use the rest positions or biasing force of the tools can be varied. The invention is not limited to the particular combinations shown.

It will be understood that each of the elements described above, or two or more together, may also find a useful application in other types of machinery differing from the types described above.

While the invention has been illustrated and described as embodied in a cultivator, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural ground-working apparatus comprising:

a frame displaceable along the ground in a predetermined normal direction of travel;

a plurality of ground-penetrating tools spaced horizontally apart on said frame;

separate mounting means between said frame and each of said tools forming for each of said tools a separate pivot on said frame for pivoting of each tool on said support forwardly and backwardly relative to said direction of travel from a respective normal central position, the separate pivot for each tool being a pivot about which only that one of said plurality of ground-penetrating tools pivots; and equalizing means including only a plurality of hydraulic cylinder-piston units each operatively connected to a respective one of said tools and fluid-filled conduit means interconnecting said units for pivoting one of said tools forwardly about the separate pivot thereof relative to said frame from the respective central position on displacement of another of said tools backwardly relative to said frame about the separate pivot thereof from the respective central position.

2. The apparatus defined in claim 1 wherein said equalizing means further include a body of relatively incompressible hydraulic fluid.

3. The apparatus defined in claim 2 wherein said equalizing means define a substantially fixed-volume chamber for said fluid.

4. The apparatus defined in claim 1 wherein each of said pivots has a generally horizontal pivot axis extending transversely to said direction of travel and lying relative to said direction substantially ahead of the respective tool in the central position thereof.

5. The apparatus defined in claim 1 wherein each of said tools includes an upwardly directed rigid arm, said units bearing on said arms.

6. The apparatus defined in claim 1, further comprising a respective horizontally extending blade carried on and extending backwardly from at least one of said tools.

7. The apparatus defined in claim 6 wherein at least one of said tools has two such blades arranged one above the other.

8. The apparatus defined in claim 6 wherein each tool is provided with means including formations for attaching a one of said blades at any of a plurality of vertically offset locations.

9. The apparatus defined in claim 8 wherein each tool is formed with a plurality of vertically spaced throughgoing bores constituting the respective formations, each blade being provided with a pivot pin receivable in said bores.

10. The apparatus defined in claim 6 wherein each blade is provided with at least one vertically extending wing also extending in said direction.

11. The apparatus defined in claim 10 wherein each blade is generally V-shaped and open backwardly in said direction and has a plurality of such wings.

12. The apparatus defined in claim 6, further comprising means for maintaining each of said blades generally parallel to the ground regardless of the position of the respective tool.

13. The apparatus defined in claim 12, wherein said means for maintaining includes at least one link associated with each blade and with the respective tool and forming therewith a generally parallelogrammatic linkage.

14. The apparatus defined in claim 13 wherein said linkages each have in said normal central position of the respective tool a pair of lower axes and a pair of upper axes generally ahead of said lower axes in said direction.

15. The apparatus defined in claim 6 wherein said blade has outer sharp edges.

16. The apparatus defined in claim 1 wherein said mounting means includes a plurality of mounts each carrying a respective tool and the respective hydraulic cylinder-piston unit and each has means for removably securing itself to said frame.

17. The apparatus defined in claim 16 wherein each tool is provided with a horizontally extending and backwardly directed blade.

18. The apparatus defined in claim 17, further comprising a link between each of said blades and the respective mount, said link being pivoted with said mount and said blade and said tool being pivoted with said mount and said blade to form a generally parallelogrammatic linkage.

19. The apparatus defined in claim 18 wherein said units are each pivoted at one end on the respective tool.

20. The apparatus defined in claim 14 wherein said mounts each include a pair of side pieces extending in said direction and flanking the respective unit and link.

21. The apparatus defined in claim 16 wherein said means for removably securing includes at least one threaded bolt engageable with said frame.

22. The apparatus defined in claim 1 wherein said frame is adapted to be pulled behind a tractor that leaves wheel tracks and at least one tool is positionable to follow said tractor in a one of said tracks and is arranged lower relative to said frame than the other tools.

23. The apparatus defined in claim 1, further comprising means for vertically displacing said tools and for locking each tool in any of a plurality of vertically offset positions.

24. The apparatus defined in claim 1, further comprising a ground-engaging wheel carried on said frame and for supporting same a predetermined distance above the ground.

25. The apparatus defined in claim 1 wherein each mounting means includes a relatively long arm pivoted on said frame and having a length between the respective tool and the respective pivot which is a multiple of the distance of the lower end of the respective tool from the respective long arm.

26. The apparatus defined in claim 1 wherein each mounting means includes a generally parallelogrammatic linkage carrying the respective tool and maintaining same at generally the same angle with respect to said frame.

27. The apparatus defined in claim 1 wherein each tool has a substantially vertical axis in its respective central position and each of said hydraulic cylinder-piston units is pivoted at one end on the respective tool and at the other end on said frame ahead of the pivot of the respective tool, the distance between the pivot at said other end of each hydraulic cylinder-piston unit and the pivot of the respective tool measured parallel to said axis increasing as the respective tool is moved backwardly from the respective central position.

28. An agricultural ground-working apparatus comprising:

a frame displaceable along the ground in a predetermined normal direction of travel;

at least three ground-penetrating tools spaced horizontally apart on said frame;

separate mounting means between said frame and each of said tools forming for each of said tools a separate pivot on said frame for pivoting of each tool on said support forwardly and backwardly relative to said direction of travel from a respective normal central position, the separate pivot for each tool being a pivot about which only that one of said plurality of ground-penetrating tools pivots; and equalizing means including only a number of hydraulic cylinder-piston units corresponding to the number of tool and each operatively connected to a respective one of said tools and fluid-filled conduit means interconnecting said units for pivoting at most two of said tools forwardly about the separate pivot thereof relative to said frame from the respective central position on displacement of another of said tools backwardly relative to said frame about the separate pivot thereof from the respective central position.

* * * * *